US005560629A

United States Patent [19]
Allard et al.

[11] Patent Number: 5,560,629
[45] Date of Patent: Oct. 1, 1996

[54] SPARE TIRE AND AXLE ASSEMBLY FOR A TRAILER

[76] Inventors: David J. Allard, 1265 Fish Hatchery Rd.; Diane G. Smith, 11 Sturdevant Rd., both of Sequim, Wash. 98382

[21] Appl. No.: 323,846

[22] Filed: Oct. 17, 1994

[51] Int. Cl.⁶ .............................. B60P 3/10; B62D 63/08; B62D 61/12
[52] U.S. Cl. .................. 280/414.2; 280/43; 280/475; 280/767; 301/132; 301/130
[58] Field of Search .............................. 280/414.2, 43.17, 280/43, 475, 763.1, 764.1, 767; 301/131, 132, 130

[56] References Cited

U.S. PATENT DOCUMENTS

| | | | |
|---|---|---|---|
| 3,210,784 | 10/1965 | Krance | 280/43 |
| 3,655,220 | 4/1972 | Rodgers | 280/475 |
| 3,869,149 | 3/1975 | Dixon | 280/475 |
| 4,779,889 | 10/1988 | Morrison | 280/475 |
| 4,799,648 | 1/1989 | Holm et al. | 254/420 |
| 5,087,063 | 2/1992 | Merrill, Jr. | 280/475 |
| 5,226,691 | 7/1993 | Kane | 301/132 |

FOREIGN PATENT DOCUMENTS 563650 9/1958 Canada ................................ 280/475

*Primary Examiner*—Anne Marie Boehler
*Assistant Examiner*—F. Zeender

[57] ABSTRACT

A new and improved spare tire and axle system for a trailer, comprising a spare tire, rim and hub assembly with an attachment plate secured thereto for coupling to a trailer. A handle raises the assembly and attachment plate to a storage position and lowers the assembly to an operative position. Locking components secure the assembly and attachment plate in one position or the other.

2 Claims, 5 Drawing Sheets

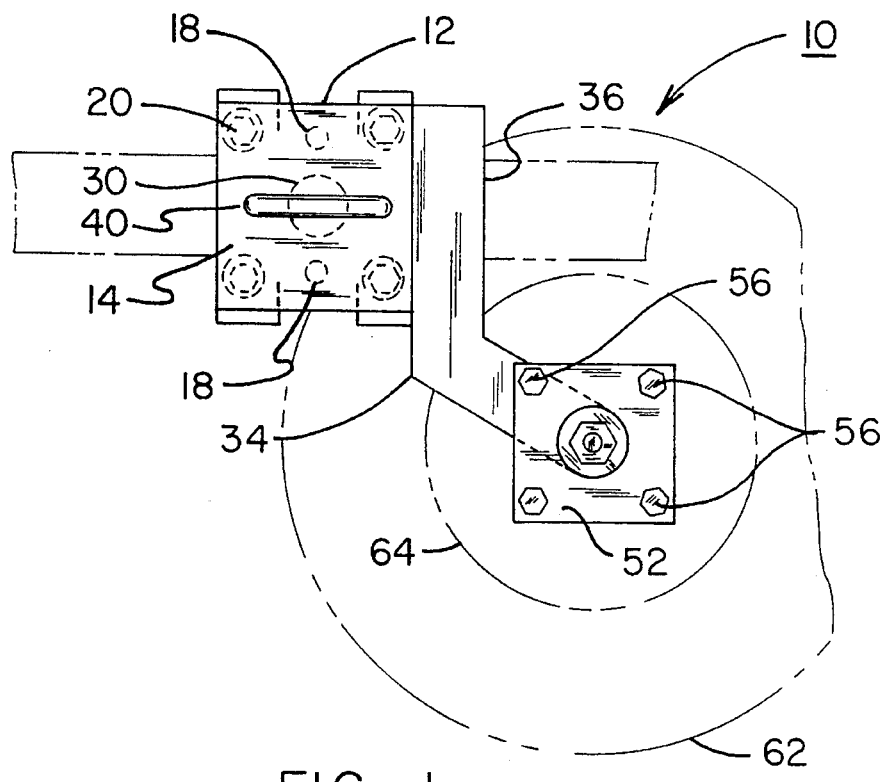
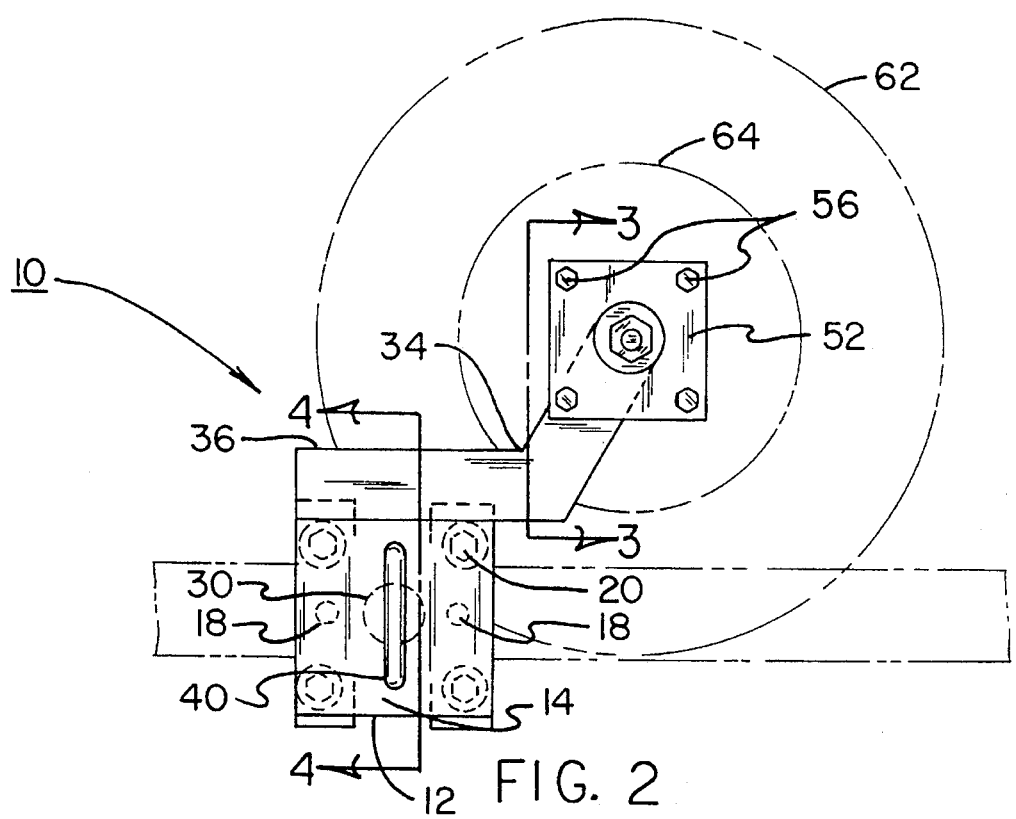

SPARE TIRE AND AXLE ASSEMBLY FOR A TRAILER

BACKGROUND OF THE INVENTION

1. Field of the Invention

The present invention relates to a spare tire and axle assembly for a trailer and more particularly pertains to maintaining readily available a spare tire and axle assembly for use in the event of a defective tire and/or axle and for use in the convenient maneuvering of the trailer.

2. Description of the Prior Art

The use of spare tires and other spare components for vehicles and trailers of a wide variety of designs and configurations is known in the prior art. More specifically, spare tires and other spare components for vehicles and trailers of a wide variety of designs and configurations heretofore devised and utilized for the purpose of repairing vehicles with flat tires, broken axles and the like through a wide variety of methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 3,655,220 to Rodgers a spare wheel carrier for supporting tongue of trailer.

U.S. Pat. No. 3,869,149 to Dixon discloses a trailer tongue spare-landing wheel structure.

U.S. Pat. No. 4,799,648 to Holm et al discloses a trailer jack using full-sized spare tire.

U.S. Pat. No. 5,087,063 to Merrill, Jr., discloses a retractable trailer tongue support jack.

Lastly, U.S. Pat. No. 5,226,691 to Kane discloses a vehicular axle assembly with removable and replaceable spindles.

In this respect, the spare tire and axle assembly for a trailer according to the present invention substantially departs from the conventional concepts and designs of the prior art, and in so doing provides an apparatus primarily developed for the purpose of maintaining readily available a spare tire and axle assembly for use in the event of a defective tire and/or axle and for use in the convenient maneuvering of the trailer.

Therefore, it can be appreciated that there exists a continuing need for a new and improved spare tire and axle assembly for a trailer which can be used to maintain readily available a spare tire and axle assembly for use in the event of a defective tire and/or axle and for use in the convenient maneuvering of the trailer. In this regard, the present invention substantially fulfills this need.

SUMMARY OF THE INVENTION

In view of the foregoing disadvantages inherent in the known types of spare tires and other spare components for vehicles and trailers of a wide variety of designs and configurations now present in the prior art, the present invention provides an improved spare tire and axle assembly for a trailer. As such, the general purpose of the present invention, which will be described subsequently in greater detail, is to provide a new and improved spare tire and axle assembly for a trailer apparatus and method which has all the advantages of the prior art and none of the disadvantages.

To attain this, the present invention essentially comprises a new and improved spare tire and axle assembly for a trailer, comprising, in combination, a trailer tongue attaching bracket which has vertically disposed parallel plates with inner and outer faces positionable on opposite sides of a standard trailer hitch adjacent the front end thereof with recesses formed in one outer face and with bolts extending above and below the trailer hitch for coupling together the plates thereto. A bushing and spacer member is coupled to one exterior face of one of the plates. The bushing and spacer member have a first disk and a second disk and a pivot pin therethrough for allowing the relative rotation of the second disk with respect to the first disk. A main body rotation box with an inner end is secured to the second disk on the side thereof remote from the trailer tongue attaching bracket. The main body rotation box has a linear extent and an angled extent at the outer end thereof remote from the bushing and spacer. A spring loaded release handle is coupled to the main body rotation box. The handle has an exterior end with a grasping portion and an interior end with linear rods positionable in the recesses of the trailer tongue attaching bracket for allowing the rotation of the main body rotation box between a lower operative position and an upper storage position. A spindle carrier plate is secured to the outer end of the main body rotation plate. A trailer axle attaching plate is secured to the spindle carrier plate with a spare tire and rim releasably secured thereto. A plurality of spindle mounting bolts coupling the spare and spindle carrier plate and the trailer axle's attaching plate. A spindle and bearing is secured to the trailer axle attaching plate. A plurality of lug-nuts couplings the rim to the spindle and bearing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved spare tire and axle assembly for a trailer which has all the advantages of the prior art spare tires and other spare components for vehicles and trailers of a wide variety of designs and configurations and none of the disadvantages.

It is another object of the present invention to provide a new and improved spare tire and axle assembly for a trailer which may be easily and efficiently manufactured and marketed.

It is a further object of the present invention to provide a new and improved spare tire and axle assembly for a trailer which is of a durable and reliable construction.

An even further object of the present invention is to provide a new and improved spare tire and axle assembly for a trailer which is susceptible of a low cost of manufacture with regard to both materials and labor, and which accordingly is then susceptible of low prices of sale to the consuming public, thereby making such spare tires and other spare components for vehicles and trailers of a wide variety of designs and configurations economically available to the buying public.

Still yet another object of the present invention is to provide a new and improved spare tire and axle assembly for a trailer which provides in the apparatuses and methods of the prior art some of the advantages thereof, while simultaneously overcoming some of the disadvantages normally associated therewith.

Still another object of the present invention is to maintain readily available a spare tire and axle assembly for use in the event of a defective tire and/or axle and for use in the convenient maneuvering of the trailer.

Lastly, it is an object of the present invention to provide a new and improved spare tire and axle system for a trailer, comprising a spare tire, rim and hub assembly with an attachment plate secured thereto for coupling to a trailer. A handle raises the assembly and attachment plate to a storage position and lowers the assembly to an operative position. Locking components secure the assembly and attachment plate in one position or the other.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the preferred embodiment of the spare tire and axle assembly for a trailer constructed in accordance with the principles of the present invention.

FIG. 2 is a side elevational view similar to FIG. 1 but illustrating the device in the inverted orientation for storage.

Similar reference characters refer to similar parts throughout the several views of the drawings.

DESCRIPTION OF THE PREFERRED EMBODIMENT

Figure 3:
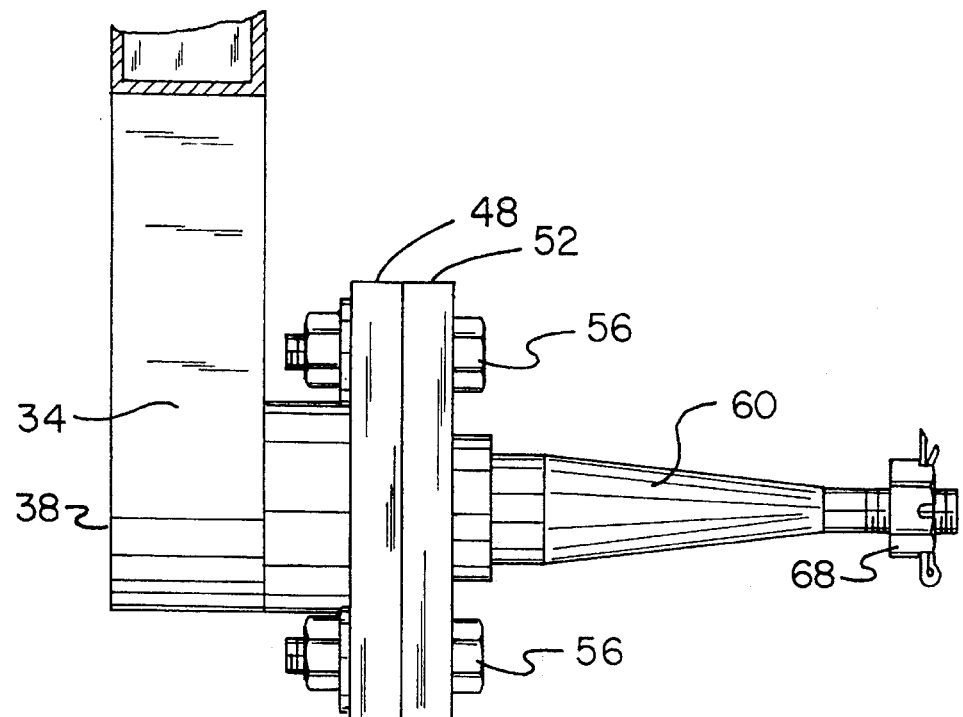
FIG. 3 is a cross-sectional view taken along line 3—3 of FIG. 2.
Figure 4:
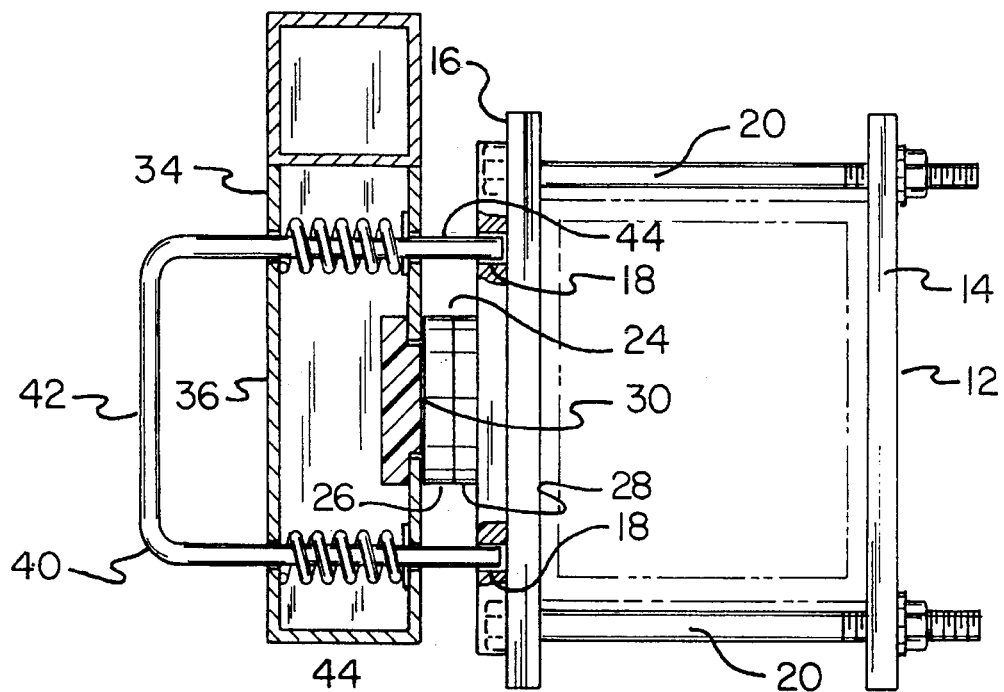
FIG. 4 is a cross-sectional view taken along line 4—4 of FIG. 2.

With reference now to the drawings, and in particular to FIG. 1 thereof, a new and improved spare tire and axle assembly for a trailer embodying the principles and concepts of the present invention and generally designated by the reference numeral 10 will be described.

The present invention, the new and improved spare tire and axle assembly for a trailer, is comprised of a plurality of components. Such components in their broadest context include an attaching bracket and rotation box with a pivot member therebetween and with a spindle and tire releasably mounted to the rotation box. Such components are individually configured and correlated with respect to each other so as to attain the desired objective.

More specifically, the spare tire and axle assembly for a trailer system 10 of the present invention has as a central component a trailer tongue attaching bracket 12. Such bracket has vertically disposed parallel plates 14, 16 with inner and outer faces positionable on opposite sides of a standard trailer hitch adjacent the front end thereof. It also has securement recesses 18 formed in one outer face and with bolts 20 extending above and below the trailer hitch for coupling together the plates thereto.

A bushing and spacer member 24 is coupled to one exterior face of one of the plates. The bushing and spacer member has a first disk 26 and a second disk 28 and a pivot pin 30 therethrough. This allows for the relative rotation of the second disk with respect to the first disk.

A main body rotation box 34 is next provided. Such box is formed with an inner end 36 secured to the second disk on the side thereof remote from the trailer tongue attaching bracket. The main body rotation box has a linear extent at the inner end 38. It also has an angled extent at the outer end thereof remote from the bushing and spacer.

A spring loaded release handle 40 is next provided to couple to the main body rotation box. The handle has an exterior end with a grasping portion 42 and an interior end with linear rods 44. Such rods are positionable in the recesses of the trailer tongue attaching bracket for securing the main body rotation box between a lower operative position and an upper storage position.

A spindle carrier box 48 is secured to the outer end of the main body rotation plate. A trailer axle attaching plate 52 is secured to the spindle carrier plate. A plurality of spindle mounting bolts 56 couple the spindle carrier plate and the trailer axle's attaching plate.

A spindle and bearing 60 is secured to the trailer axle attaching plate with a spare tire 62 and rim 64 releasably secured thereto. A plurality of lug-nuts 68 function to couple the rim to the spindle and bearing.

As can be readily understood, the pulling of the handle allows rotation of the wheel and axle between the down or functioning position of FIG. 1 and the up or storage position of FIG. 2.

An alternate embodiment of the invention is shown in FIGS. 5 through 8. In such embodiment, a spare tire 76, rim 78 and hub matching the trailer tires is bolted to an attachment plate 82 by a plurality of bolts 84. This spindle is designed to accommodate a brake plate for trailers with braking systems. The spindle attachment plate 82 is configured to match the plural holes in an optional standard brake plate. The spindle plate is attached to a lower rotation strut 86. This allows the wheel to revolve or swivel 360 degrees about a vertical pin 88 when the rotator release pin 92 is opened.

Figure 5:
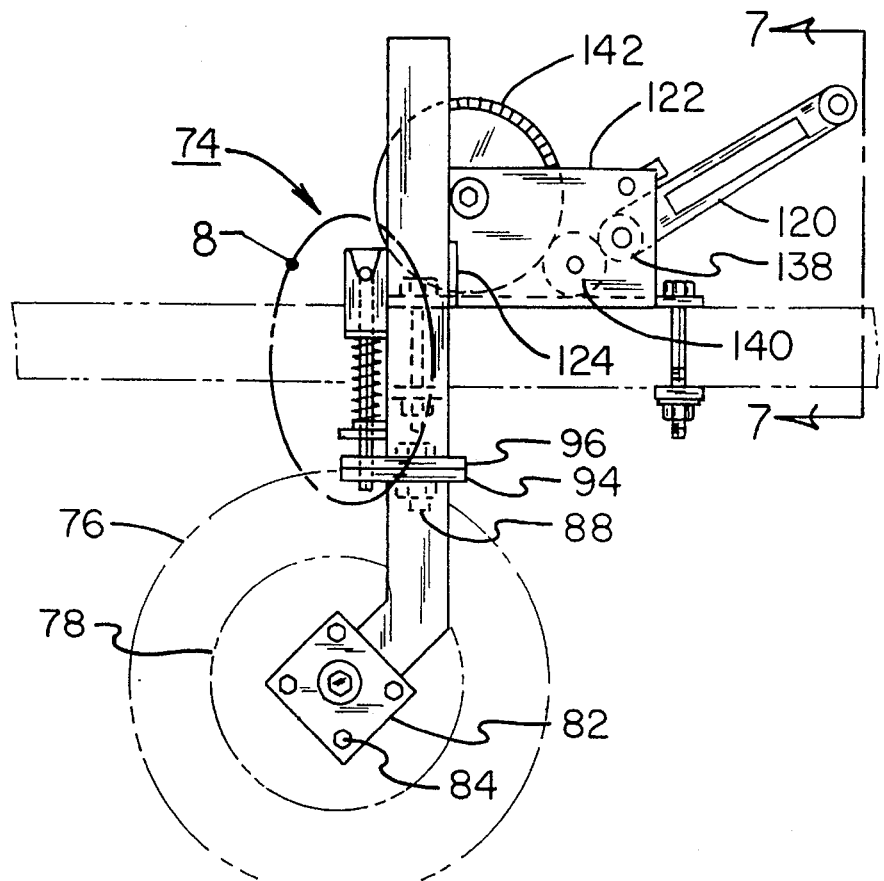
FIG. 5 is a side elevational view similar to FIG. 1 but illustrating an alternate embodiment of the invention.
Figure 6:
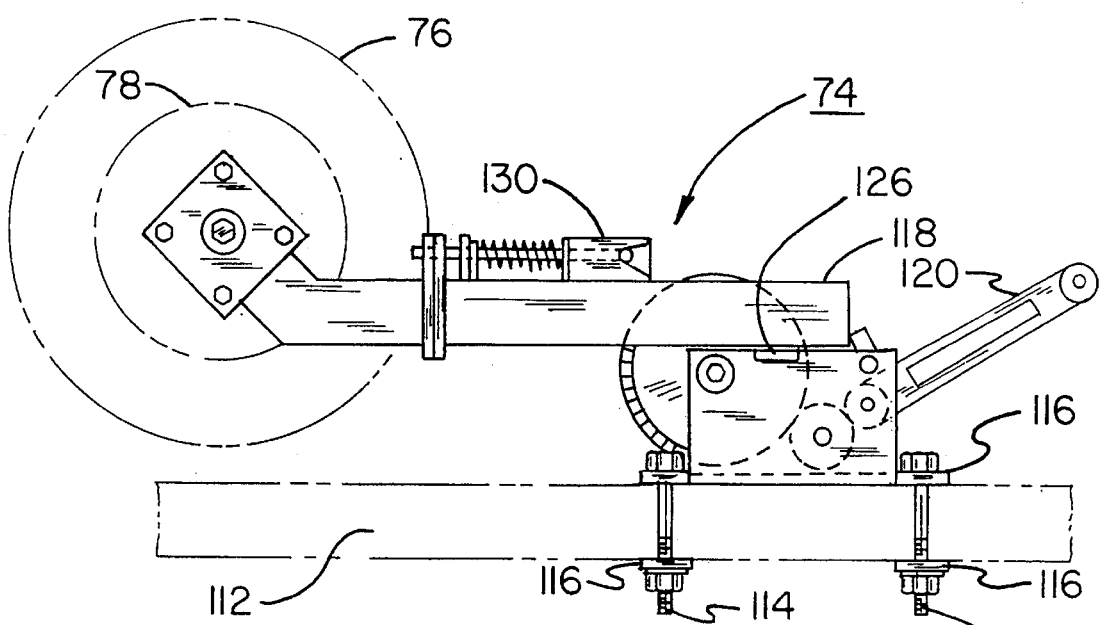
FIG. 6 is a view similar to FIG. 5 but illustrating the tire in an alternate orientation for storage.
Figure 7:
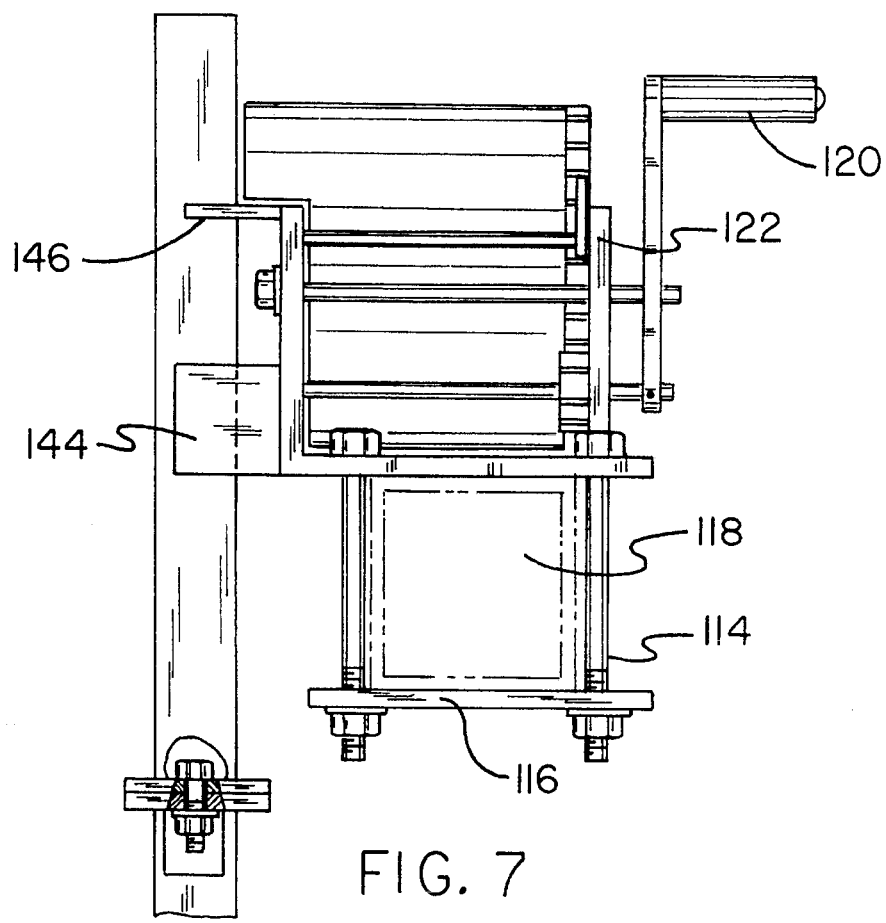
FIG. 7 is a front elevational view of the device taken along line 7—7 of FIG. 5.
Figure 8:
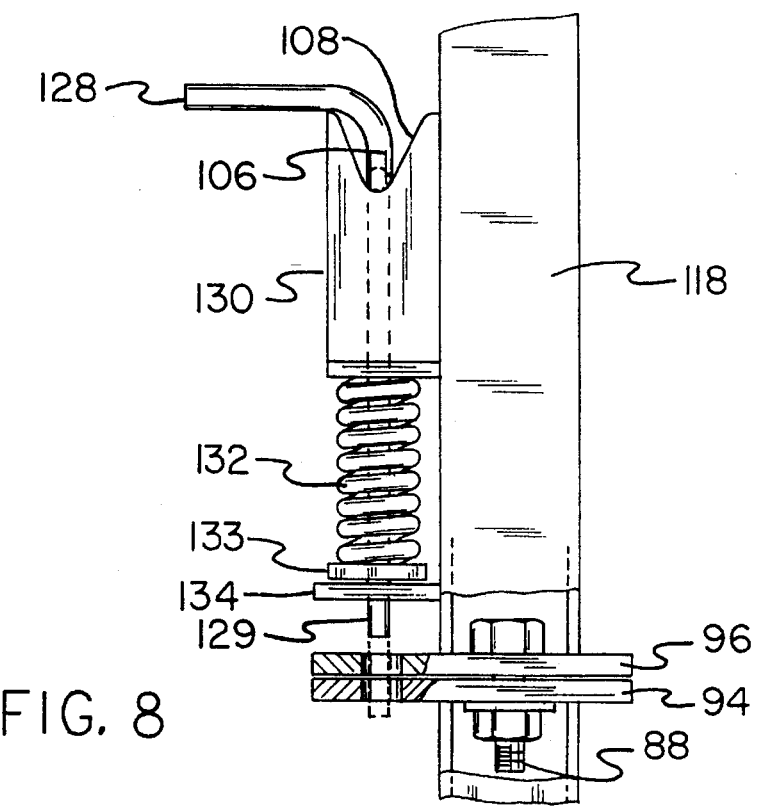
FIG. 8 is a side elevational view of the coupling components taken at oval 8 of FIG. 5.

With the spare in the lower position as shown in FIG. 5, a boat trailer can be maneuvered easily in a confined area or launch site. With the spare tire in the upper position as shown in FIG. 6, the spare tire and related elements are merely stored in position for use in the event of the need for them.

The entire system is attached to a boat trailer tongue aft of the hitch assembly and forward of the boat winch so as to clear the boat in its stowed position.

The system is bolted to trailer tongue 112 by a plurality of bolts 114 and attaching brackets 116. The spare wheel carrier unit 118 is raised and lowered by rotating the operating handle 120. A ratchet release locks the upper spare carrier unit against the retraction stop plate 126. A barrel drive gear and spacer 122 is welded to the upper spare carrier unit 118 and aligns with special stop plates 124 and 126 when in the lowered or stowed position.

The rotator release pin handle 128 secures the upper spare carrier unit to the rotation strut 86 and prevents the unit from swiveling in the stowed position by engaging rotator release pin lock 106 in housing 130 with its lower end 129 extending through apertures in the rotatable plates 94 and 96. A V-shaped notch 108 allows the handle 128 to be retained in the upper position as shown in the solid line configuration of FIG. 8 for swiveling of the wheel. The lower apex of the notch 108 allows the handle to move to the lower dotted line position for locking the wheel against swiveling.

Spring 132 holds the pin in the lower position by the lower end of the spring being secured to reciprocable plate 133 which is limited in movement by plate 134 secured to the wheel carrier unit 118.

The system utilizes a modified trailer axle designed to accommodate the spindle plate assembly 82. The trailer axle 80 has a spindle connector plated welded at both ends. The connector plates match the hole configuration of the spindle plate 82 on the assembly unit.

Figure 9:
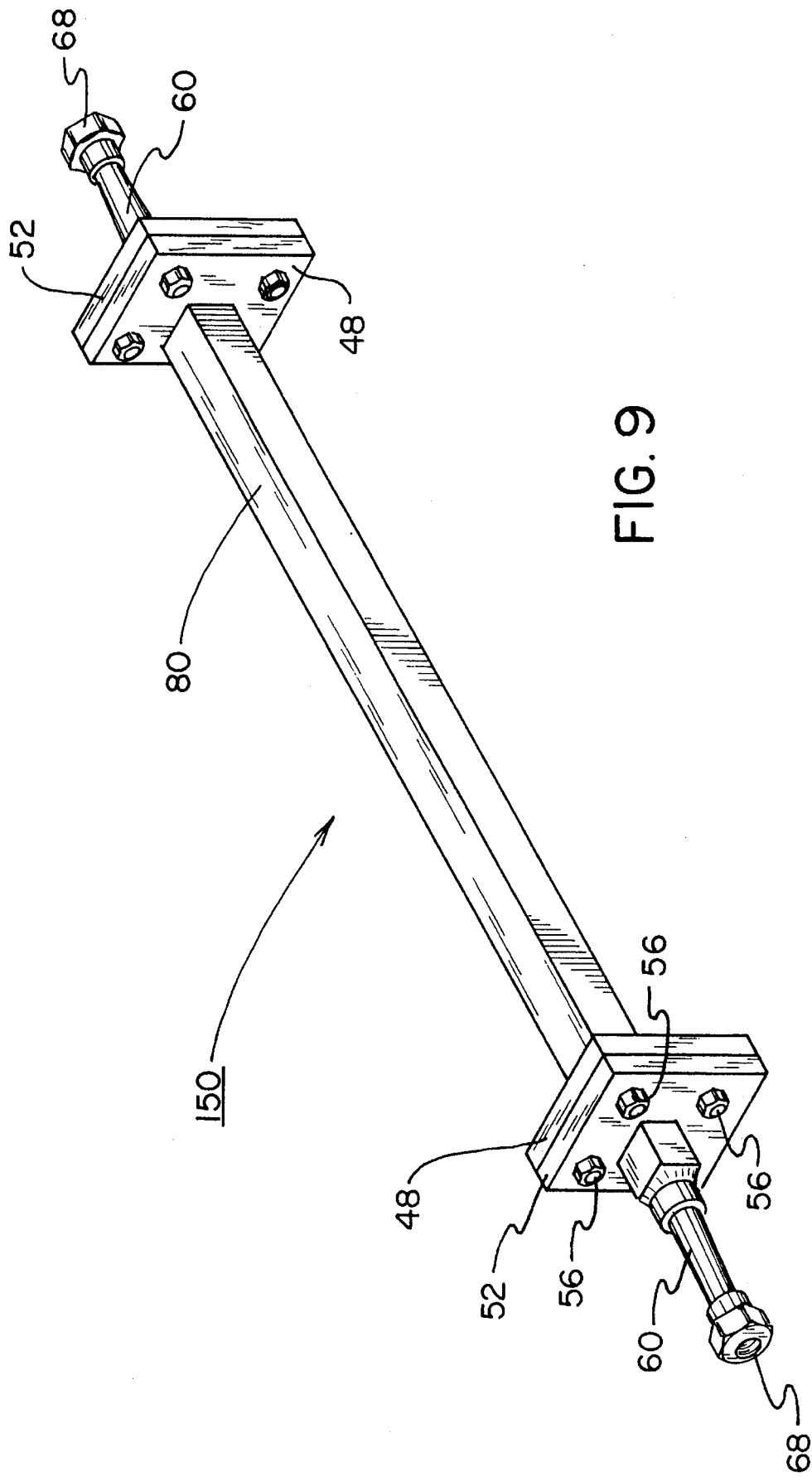
FIG. 9 is a perspective illustration of an improved axle adapted for use in association with the apparatus as described above.

Shown in FIG. 9 is a perspective illustration of an improved axle assembly 150 adapted for use in association with the apparatus as described above. In its broadest context, the axle assembly is fabricated of three separable components. There is a central component, the trailer axle 80, essentially permanently mounted with respect to the trailer. The other components of the trailer assembly include a spindle and bearing assembly 60 on each end of the trailer axle. Each spindle bearing assembly is adapted to receive a wheel and tire 76 used during the operation and use of the trailer. Each exterior end of the trailer axle is provided with a plate 48 of a rectangular configuration and having an aperture formed in each corner. In association therewith, each spindle and bearing assembly includes a similarly configured rectangular plate 52 having four matching apertures. Removable bolts 56 with nuts couple each spindle and bearing assembly with its associated end of the trailer axle. Located outboardly of the ends of the trailer axle and secured to the outboard face of the exterior plates is the spindle and bearing for supporting the wheel and tire. On the extreme outboard end are an axle hub lock nut 68 with a cotter pin to hold the appropriate tire in place on the spindle and bearing. In this manner, in the event of a flat tire or other accident, the nuts and bolts of one or both mating plates at the end of the axle assembly may be removed to remove the defective tire and spindle or bearing. It then can be readily replaced with the replacement wheel and tire along with the replacement spindle and bearing assembly by simply placing it in proper position and attaching it with respect to the trailer axle through the four lug bolts and associated nuts. It has been found that the axle assembly as described herein is significantly different than anything in the prior art. It may machined more simply and easily thereby making it more attractive to manufacture and produce. The axle is designed to accept the replaceable spindles as described above in the most convenient and efficient manner.

In summary then, another significant difference between the present invention and the prior art is that the present invention allows for the axle to conveniently accept a plate from the spindle and bearing assembly unit with a wheel and tire as described above.

Many people enjoy owning and using a power boat or sail boat. Some rent slips to always have their boat in the water and immediately available when they want to cruise. Others prefer to transport the boat on a trailer each time it is to be used. The latter is the rule for a majority of people who cannot use the boat at regular intervals, or cannot afford to pay for dock space. Traveling with a trailer can present problems that require special attention. If the trailer breaks down while traveling, this often means that it must be left unattended at the side of the highway while the owner drives off to find help. This leaves the boat open to vandalism, theft, and also presents a road hazard. One major cause of this situation is a flat tire when no spare is available, or a frozen or failing wheel bearing.

The present invention provides a solution to both of these problems. It consists of a new axle and spare mount that replaces the original equipment. The axle has been modified to permit changing the spindle assembly by removing four bolts which attach it to the axle assembly. The spare tire mount has a spindle assembly that can be used to replace the failed one. This is a relatively simple task which requires jacking and securing the trailer, removing the four bolts holding the failed spindle to the axle, and replacing it with the one from the spare mount. The failed one is then attached to the spare mount, the tire is mounted, and the trip can continue.

In addition to the above, the present invention also provides a means for moving the trailer around when not attached to a towing vehicle. The spare tire mount can be rotated down to cause the spare to contact and ride on the ground. It can also be used when launching the boat to eliminate having to back the tow vehicle into the water and also for maneuvering the trailer in tight parking and storage areas.

The present invention can be installed on existing trailers, and incorporated into the design on new trailers. It will be greatly appreciated, especially by those who often haul their boat for long distances on a regular basis.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved spare tire and axle system for a trailer, comprising, in combination:

a trailer tongue attaching bracket having vertically disposed parallel plates with inner and outer faces positionable on opposite sides of a standard trailer hitch adjacent the front end thereof with recesses formed in one outer face and with bolts extending above and below the trailer hitch for coupling the plates to each other around the trailer hitch;

a bushing and spacer member coupled to one exterior face of one of the plates, the bushing and spacer member having a first disk and a second disk and a pivot pin therethrough for allowing the relative rotation of the second disk with respect to the first disk;

a main body rotation box with an inner end secured to the second disk on the side thereof remote from the trailer tongue attaching bracket, the main body rotation box having a linear extent and an angled extent at the outer end thereof remote from the bushing and spacer;

a spring loaded release handle coupled to the main body rotation box, the handle having an exterior end with a grasping portion and an interior end with linear rods positionable in the recesses of the trailer tongue attaching bracket for allowing the rotation of the main body rotation box between a lower operative position and an upper storage position;

a spindle carrier plate secured to the outer end of the main body rotation box;

a trailer axle attaching plate secured to the spindle carrier plate with a spare tire and rim releasably secured thereto;

a plurality of spindle mounting bolts coupling the spindle carrier plate and the trailer axle's attaching plate;

a spindle and bearing secured to the trailer axle attaching plate; and a lug-nut coupling the rim to the spindle and bearing.

2. A new and improved spare tire and axle system for a trailer, comprising, in combination:

a spare tire, rim and hub assembly with an attachment plate, a trailer tongue attaching bracket securing the attachment plate to a trailer hitch and allowing ninety degree rotation of the attachment plate relative thereto, the trailer tongue attaching bracket having vertically disposed parallel plates with inner and outer faces positionable on opposite sides of the trailer hitch adjacent the front end thereof with bolts extending above and below the trailer hitch for coupling the plate to each other around the trailer hitch;

a reciprocable member with two rods positionable in preselected opposing recesses spaced in a single vertical plane for raising the assembly and attachment plate to a storage position, the two rods being positionable in preselected opposing recesses spaced in a single horizontal plane when lowering the assembly to an operative position; and locking components to secure the assembly and attachment plate in the storage position and the operative position.

* * * * *